(12) United States Patent
Bauer et al.

(10) Patent No.: US 9,115,025 B2
(45) Date of Patent: Aug. 25, 2015

(54) AEROGEL COMPOSITIONS AND METHODS OF MAKING AND USING THEM

(75) Inventors: Ulrich Bauer, Taunus (DE); Dhaval A. Doshi, Lexington, MA (US)

(73) Assignee: ROCKWOOL INTERNATIONAL A/S, Hedehusene (DK)

(*) Notice: Subject to any disclaimer, the term of this patent is extended or adjusted under 35 U.S.C. 154(b) by 717 days.

(21) Appl. No.: 13/266,577

(22) PCT Filed: Apr. 23, 2010

(86) PCT No.: PCT/US2010/032235
§ 371 (c)(1),
(2), (4) Date: Jan. 12, 2012

(87) PCT Pub. No.: WO2010/129200
PCT Pub. Date: Nov. 11, 2010

(65) Prior Publication Data
US 2012/0097907 A1    Apr. 26, 2012

Related U.S. Application Data

(60) Provisional application No. 61/173,046, filed on Apr. 27, 2009.

(51) Int. Cl.
| C04B 14/04 | (2006.01) |
| C04B 28/02 | (2006.01) |
| C04B 28/14 | (2006.01) |
| C04B 28/26 | (2006.01) |
| C04B 14/06 | (2006.01) |
| C04B 14/30 | (2006.01) |
| C04B 111/00 | (2006.01) |
| C04B 111/28 | (2006.01) |

(52) U.S. Cl.
CPC ............. *C04B 28/02* (2013.01); *C04B 14/064* (2013.01); *C04B 14/302* (2013.01); *C04B 28/14* (2013.01); *C04B 28/26* (2013.01); *C04B 2111/00482* (2013.01); *C04B 2111/28* (2013.01); *C04B 2201/32* (2013.01); *Y02W 30/97* (2015.05)

(58) Field of Classification Search
CPC ...... C04B 14/04; C04B 14/302; C04B 28/02; C04B 28/14; C04B 28/26; C04B 14/064
USPC ........................................................ 252/62
See application file for complete search history.

(56) References Cited

U.S. PATENT DOCUMENTS

| 5,786,059 A | 7/1998 | Frank et al. |
| 5,789,075 A | 8/1998 | Frank et al. |
| 5,948,314 A * | 9/1999 | Geiss et al. ................. 252/62 |

(Continued)

FOREIGN PATENT DOCUMENTS

| DE | 44 41 567 A1 | 5/1996 |
| DE | 20 2005 021 201 U1 | 7/2007 |

(Continued)

*Primary Examiner* — Paul Marcantoni
(74) *Attorney, Agent, or Firm* — Tarolli, Sundheim, Covell & Tummino LLP

(57) ABSTRACT

Compositions include an aerogel component and have low thermal conductivity. Methods for preparing slurries or composites include, for example combining the aerogel component with a surfactant, binder and other ingredients, such as, for instance, fibers. The compositions can be slurries that can be used in coating applications or self supporting rigid composites.

21 Claims, 3 Drawing Sheets

Scanning electron micrograph of an aerogel – mineral fibre composite made with high pH water.

(56) References Cited

U.S. PATENT DOCUMENTS

| | | |
|---|---|---|
| 6,080,475 A | 6/2000 | Frank et al. |
| 6,709,600 B2 | 3/2004 | Hrubesh et al. |
| 6,887,563 B2 * | 5/2005 | Frank et al. ................ 428/312.6 |
| 7,635,411 B2 * | 12/2009 | Rouanet et al. ............... 106/600 |
| 8,021,583 B2 * | 9/2011 | Rouanet et al. ................. 264/76 |
| 2001/0034375 A1 | 10/2001 | Schwertfeger et al. |
| 2005/0046086 A1 | 3/2005 | Lee et al. |
| 2005/0167891 A1 | 8/2005 | Lee et al. |
| 2006/0125158 A1 | 6/2006 | Rouanet et al. |
| 2010/0080949 A1 * | 4/2010 | Ou et al. ......................... 428/80 |
| 2011/0206471 A1 * | 8/2011 | Doshi et al. .................... 408/1 R |
| 2012/0128958 A1 * | 5/2012 | Zeng et al. ..................... 428/219 |
| 2013/0344279 A1 * | 12/2013 | Doshi et al. ..................... 428/74 |

FOREIGN PATENT DOCUMENTS

| | | |
|---|---|---|
| WO | WO-02/52086 A2 | 7/2002 |
| WO | WO-2006/032655 A2 | 3/2006 |
| WO | WO-20071011988 A2 | 1/2007 |
| WO | WO-2007/047970 A2 | 4/2007 |

\* cited by examiner

Figure 1: Photograph of a self-supporting rigid composite that exhibits an ultra low thermal conductivity. Dimensions are 20cm x 20cm

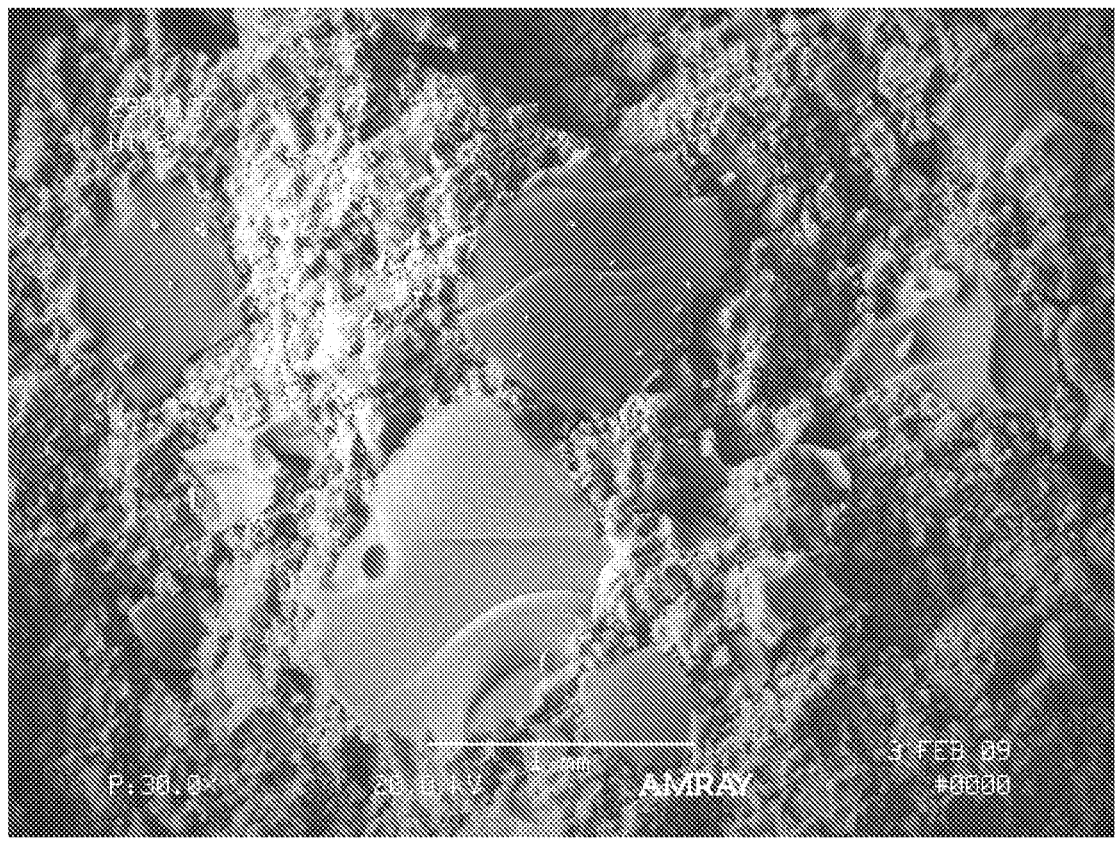
Figure 2: Scanning electron micrograph of a grout-aerogel composite.

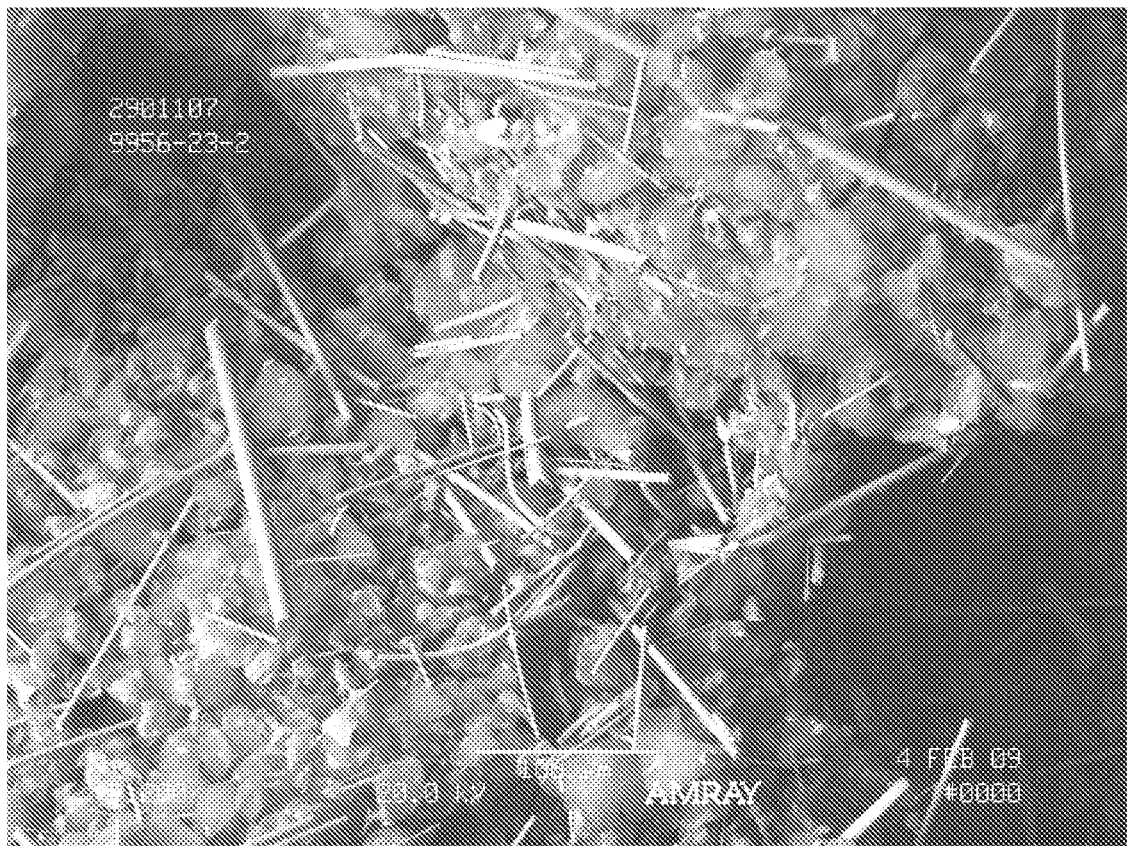
Figure 3: Scanning electron micrograph of an aerogel - mineral fibre composite made with high pH water.

US 9,115,025 B2

AEROGEL COMPOSITIONS AND METHODS OF MAKING AND USING THEM

RELATED APPLICATIONS

This application claims the benefit under 35 USC 119(e) of U.S. Provisional Application No. 61/173,046 filed on Apr. 27, 2009, which is incorporated herein by reference in its entirety.

BACKGROUND OF THE INVENTION

Green construction favors materials and practices that provide excellent characteristics yet are simple and easy to manufacture and to use. Good insulation, for instance, reduces energy requirements and is an important consideration in many construction projects.

SUMMARY OF THE INVENTION

A need exists, therefore, for materials that have low thermal conductivity and/or that combine two or more desirable properties such acoustic and/or mechanical properties.

The invention generally relates to compositions that include an aerogel component, as well as methods for making and using the compositions.

In some aspects, the composition is in the form of a slurry and includes a surfactant, an organic or inorganic binder and, optionally, other ingredients, such as, for instance, fibers. In other aspects, the composition is in the form of a slurry and includes the aerogel component and high pH water. Upon drying, a slurry composition forms a composite material that can be a coating or a self supporting rigid composite. Preferably, the composite has a thermal conductivity no greater than about 50 mW/(m·K), measured according to ASTM C518. For instance, a self supporting rigid composite includes an aerogel component in particulate form and has a thermal conductivity no greater than about 20 mW/(m·K), measured according to ASTM C518.

Many of the compositions described herein are easily made and simple to use. Embodiments of the invention provide excellent insulating properties to materials employed in the construction industry and can be incorporated into or utilized to overlay or join such materials. Hydrophobic properties associated with some of the compositions disclosed herein can be exploited in façade work or other instances that involve wet environments. The presence of aerogel can reduce the overall weight of the material, an important consideration in many construction projects. Together, stickiness and lightweight can be particularly advantageous in ceiling plastering and the like, where they can decrease peeling or dislocation. In many embodiments, composites described herein have excellent flame resistance properties and/or acoustic dampening properties suitable for sound or noise reduction applications.

In some implementations, the composition disclosed herein is prepared using a reduced number of ingredients, while retaining excellent properties. For example, using either an inorganic binder or an inorganic binder-containing formulation, but not both, can simplify preparation protocols and decrease costs. The number of ingredients also can be reduced by combining aerogel with a high pH aqueous phase and/or by utilizing compounds that have both binding and surface active properties.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a photograph of a 20 cm×20 cm self supporting rigid composite having ultralow thermal conductivity and produced according to an embodiment of the invention.

FIG. 2 is a scanning electron microscope (SEM) image showing aerogel and grout regions in a composite according to an embodiment of the invention.

FIG. 3 is a SEM image of a composite that includes fibers and was prepared using high pH water, according to an embodiment of the invention.

DETAILED DESCRIPTION OF THE PREFERRED EMBODIMENTS

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

The invention generally relates to a composition, method of making the composition and method of using it.

The composition disclosed herein can be in the form of a dry mixture, solution, dispersion, suspension, slurry, paste, a dried or cured product, such as a solid, e.g., a self supporting rigid composite, a multilayered composite, made, for instance by laminating together aerogel blankets, and so forth. The composition can be formed into, applied onto or incorporated in various articles.

Generally the composition includes an aerogel component. Aerogels are low density porous solids that have a large intraparticle pore volume and typically are produced by removing pore liquid from a wet gel. However, the drying process can be complicated by capillary forces in the gel pores, which can give rise to gel shrinkage or densification. In one manufacturing approach, collapse of the three dimensional structure is essentially eliminated by using supercritical drying. A wet gel also can be dried using ambient pressure, also referred to as non-supercritical drying process. When applied, for instance, to a silica-based wet gel, surface modification, e.g., end-capping, carried out prior to drying, prevents permanent shrinkage in the dried product. The gel can still shrink during drying but springs back recovering its former porosity.

Product referred to as "xerogel" also is obtained from wet gels from which the liquid has been removed. The term often designates a dry gel compressed by capillary forces during drying, characterized by permanent changes and collapse of the solid network.

For convenience, the term "aerogel" is used herein in a general sense, referring to both "aerogels" and "xerogels".

Aerogels typically have low bulk densities (about 0.15 g/cm$^3$ or less, preferably about 0.03 to 0.3 g/cm$^3$), very high surface areas (generally from about 300 to about 1,000 square meters per gram (m$^2$/g) and higher, preferably from about 600 to about 1000 m$^2$/g), high porosity (about 90% and greater, preferably greater than about 95%), and a relatively large pore volume (e.g., about 3 milliliter per gram (mL/g), preferably about 3.5 mL/g and higher, for instance, 7 mL/g). Aerogels can have a nanoporous structure with pores smaller than 1 micron (μm). Often, aerogels have a mean pore diameter of about 20 nanometers (nm). The combination of these properties in an amorphous structure gives the lowest thermal conductivity values (e.g., 9 to 16 mW/m-K at a mean temperature of 37° C. and 1 atmosphere of pressure) for any coherent solid material. Aerogels can be nearly transparent or translucent, scattering blue light, or can be opaque.

A common type of aerogel is silica-based. Aerogels based on oxides of metals other than silicon, e.g., aluminum, zirconium, titanium, hafnium, vanadium, yttrium and others, or mixtures thereof can be utilized as well.

Also known are organic aerogels, e.g., resorcinol or melamine combined with formaldehyde, dendretic polymers, and so forth, and the invention also could be practiced using these materials.

Suitable aerogel materials and processes for their preparation are described, for example, in U.S. Patent Application No. 2001/0034375 A1 to Schwertfeger et al., published on Oct. 25, 2001, the teachings of which are incorporated herein by reference in their entirety.

Preferably, the aerogel component contains hydrophobic aerogel. As used herein, the terms "hydrophobic" and "hydrophobized" refer to partially as well as to completely hydrophobized aerogel. The hydrophobicity of a partially hydrophobized aerogel can be further increased. In completely hydrophobized aerogels, a maximum degree of coverage is reached and essentially all chemically attainable groups are modified.

Hydrophobicity can be determined by methods known in the art, such as, for example, contact angle measurements or by methanol (MeOH) wettability. A discussion of hydrophobicity in relation to aerogels is found, for example, in U.S. Pat. No. 6,709,600 B2 issued to Hrubesh et al. on Mar. 23, 2004, the teachings of which are incorporated herein by reference in their entirety.

Hydrophobic aerogels can be produced by using hydrophobizing agents, e.g., silylating agents, halogen- and in particular fluorine-containing compounds such as fluorine-containing alkoxysilanes or alkoxysiloxanes, e.g., trifluoropropyltrimethoxysilane (TFPTMOS), and other hydrophobizing compounds known in the art. Hydrophobizing agents can be used during the formation of aerogels and/or in subsequent processing steps, e.g., surface treatment.

Silylating compounds such as, for instance, silanes, halosilanes, haloalkylsilanes, alkoxysilanes, alkoxyalkylsilanes, alkoxyhalosilanes, disiloxanes, disilazanes and others are preferred. Examples of suitable silylating agents include, but are not limited to diethyldichlorosilane, allylmethyldichlorosilane, ethylphenyldichlorosilane, phenylethyldiethoxysilane, trimethylalkoxysilanes, e.g., trimethylbutoxysilane, 3,3,3-trifluoropropylmethyldichlorosilane,symdiphenyltetramethyldisiloxane, trivinyltrimethylcyclotrisiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, hexamethyldisiloxane, hexenylmethyldichlorosilane, hexenyldimethylchlorosilane, dimethylchlorosilane, dimethyldichorosilane, mercaptopropylmethyldimethoxysilane, bis{3-(triethoxysilyl)propyl}tetrasulfide, hexamethyldisilazane and combinations thereof.

In some examples, the aerogel has a hydrophilic surface or shell obtained, for example, by treating hydrophobic aerogel with a surface active agent, also referred to herein as surfactant, dispersant or wetting agent.

The surfactant may be selected from ionic (anionic and cationic) surfactants, amphoteric surfactants, nonionic surfactants, high molecular surfactants, and high molecular compounds, for example. Anionic surfactants can include, for example, alkyl sulfates and higher alkyl ether sulfates, more specifically, ammonium lauryl sulfate, and sodium polyoxyethylene lauryl ether sulfate.

Cationic surfactants include, for instance, aliphatic ammonium salts and amine salts, more specifically, alkyl trimethylammonium, and polyoxyethylene alkyl amine, for example.

Amphoteric surfactants may be of betain type, such as alkyl dimethyl betain, or of oxido type, such as alkyl dimethyl amine oxido, for example.

Nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others Generally, any surfactant that is compatible with the aerogel can be used. Specific examples of surfactants that can be employed include but are not limited to Pluronic P84, PE6100, PE6800, L121, Emulan EL, Lutensol FSA10, Lutensol XP89 all from BASF, MP5490 from Michelmann, AEROSOL OT (sodium di-2-ethylhexylsulfosuccinite), BARLOX 12i (a branched alkyldimethylamine oxide), LAS (linear alkylbenzene sulfonates) and TRITON 100 (octylphenoxypolyethoxy(9-10)ethanol), TWEEN surfactants like TWEEN 100 surfactant, and BASF pluronic surfactants and others. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof.

Increasing the amount of surfactant tends to increase the depth to which the aqueous phase can penetrate and thus the thickness of the hydrophilic coating surrounding the hydrophobic aerogel core.

Aerogel materials can include one or more additives such as fibers, opacifiers, color pigments, dyes and mixtures thereof. For instance, a silica aerogel can be prepared to contain additives such fibers and/or one or more metals or compounds thereof. Specific examples include aluminum, tin, titanium, zirconium or other non-siliceous metals, and oxides thereof. Non-limiting examples of opacifiers include carbon black, titanium dioxide, zirconium silicate, and mixtures thereof. Additives can be provided in any suitable amounts, e.g., depending on desired properties and/or specific application.

Preferred aerogel materials are produced in granular, pellet, bead, powder, or other particulate form and in any particle size suitable for an intended application. For instance, the particles can be within the range of from about 0.01 microns to about 10.0 millimeters (mm) and preferably have a mean particle size in the range of 0.3 to 3.0 mm. In many implementations larger particles are preferred. Also preferred are aerogel particles having a particle size distribution (PSD) that promotes efficient packing Examples of commercially available aerogel materials in particulate form are those supplied under the tradename of Nanogel® by Cabot Corporation, Billerica, Massachusetts. Nanogel® aerogel granules have high surface area, are greater than about 90% porous and are available in a particle size ranging, for instance, from about 8 microns (µm) to about 10 mm. Specific grades of translucent Nanogel® aerogel include, for instance, those designated as TLD302, TLD301 or TLD100; specific grades of IR-opacified Nanogel® aerogel include, e.g., those under the designation of RGD303 or CBTLD103; specific grades of opaque Nanogel® aerogel include, for instance, those designated as OGD303.

The aerogel component also can consist of, consist essentially of or can comprise pieces of monolithic aerogel that has been chopped or broken down to a suitable size.

The aerogel component also can be formed from one or more aerogel-based composite material(s). Aerogel-based composite materials can include fibers and aerogels (e.g., fiber-reinforced aerogels) and, optionally, at least one binder. The fibers can have any suitable structure. For example, the fibers can be oriented in a parallel direction, an orthogonal direction, in a common direction or a random direction. There can be one or more types of fibres. The fibres can be different in terms of their composition, size or structure. In the composite, the one type of fibers can be in different dimensions (length and diameter) and their orientation can be different. For example long fibers are in plane aligned whereas smaller fibres are randomly distributed.

In specific implementations, the aerogel component employed is a composite that includes aerogel material, a binder and at least one fiber material as described, for instance, in U.S. Pat. No. 6,887,563, issued on May 3, 2005 to Frank et al., the teachings of which are incorporated herein by reference in their entirety.

Another example of a suitable aerogel component includes at least one aerogel and at least one syntactic foam. The aerogel can be coated to prevent intrusion of the polymer into the pores of the aerogel, as described, for instance in International Publication No. WO 2007047970, with the title Aerogel Based Composites, the teachings of which are incorporated herein by reference in their entirety.

The aerogel component can be in the form of blanket in a composition in which blanket sheets are laminated together to form a multilayer composite. Examples of aerogel-based materials that can be utilized include but are not limited to a cracked monolith such as described in U.S. Pat. No. 5,789,075, issued on Aug. 4, 1998 to Frank et al., the teachings of which are incorporated herein by reference in their entirety. Preferably, the cracks enclose aerogel fragments that are connected by fibers. Aerogel fragments can have an average volume of 0.001 mm$^3$ to 1 cm$^3$. In one case, the aerogel fragments have an average volume of 0.1 mm$^3$ to 30 mm$^3$. Another aerogel component that can be employed includes a composite of an aerogel material, a binder and at least one fiber material as described, for instance, in U.S. Pat. No. 6,887,563, issued on May 3, 2005 to Frank et al., the teachings of which are incorporated herein by reference in their entirety. Other suitable aerogel components that can be employed are fiber-web/aerogel composites that include bicomponent fibers as disclosed in U.S. Pat. No. 5,786,059 issued on Jul. 28, 1998 to Frank et al., the teachings of which are incorporated herein by reference in their entirety. Such composites use at least one layer of fiber web and aerogel particles, wherein the fiber web comprises at least one bicomponent fiber material, the bicomponent fiber material having lower and higher melting regions and the fibers of the web being bonded not only to the aerogel particles but also to each other by the lower melting regions of the fiber material. In specific implementations, the aerogel component includes sheets or blankets produced from wet gel structures, as described, for instance, in U.S. Patent Application Publication Nos. 2005/0046086 A1, published Mar. 3, 2005, and 2005/0167891 A1, published on Aug. 4, 2005, both to Lee et al., the teachings of which are incorporated herein by reference in their entirety. Commercially, aerogel-type blankets or sheets are available from Cabot Corporation, Billerica, Mass. or from Aspen Aerogels, Inc., Northborough, Mass.

Combinations of materials that consist of, consist essentially of or comprise aerogel also can be employed to form the aerogel component. For instance, compositions of the invention can be produced using different types of aerogel materials e.g., by combining granular aerogels having different particle sizes and/or light transmitting properties. In one example, the combination includes TLD302 and TLD203 Nanogel® aerogels.

The aerogel component is present in the composition in any suitable amount. In some examples, the aerogel component is present in the composition in an amount within the range of from about 40 to about 95 volume %, preferably in an amount within the range of from about 60 to about 95 volume %. In terms of weight percentages, the aerogel component can be within the range of from about 5% to about 95% by weight, more preferably within the range of from about 30 to about 90% by weight. In preferred implementations the composition has a high level of aerogel loading, i.e., at least 50% by weight. In specific examples, the aerogel is present in the composition in an amount within the range of from about 50 weight % to about 75 weight %.

In addition to the aerogel component, many aspects of the invention are directed to a composition that also includes a surfactant. Surfactants that are compatible with the aerogel are preferred. The surfactant can be selected from ionic (anionic and cationic) surfactants, amphoteric surfactants, nonionic surfactants, high molecular surfactants, and high molecular compounds and so forth. Combinations of different types of surfactants also can be utilized.

Anionic surfactants can include, for example, alkyl sulfates and higher alkyl ether sulfates, more specifically, ammonium lauryl sulfate, and sodium polyoxyethylene lauryl ether sulfate. Cationic surfactants include, for instance, aliphatic ammonium salts and amine salts, more specifically, alkyl trimethylammonium, and polyoxyethylene alkyl amine, for example. Amphoteric surfactants may be of betain type, such as alkyl dimethyl betain, or of oxido type, such as alkyl dimethyl amine oxido, for example. Nonionic surfactants include glycerol fatty acid ester, propylene glycol fatty acid ester, sorbitan fatty acid ester, polyoxyethylene sorbitan fatty acid ester, tetraoleic acid polyoxyethylene sorbitol, polyoxyethylene alkyl ether, polyoxyethylene alkyl phenyl ether, polyoxyethylene polyoxypropylene glycol, polyoxyethylene polyoxypropylene alkyl ether, polyethylene glycol fatty acid ester, higher fatty acid alcohol ester, polyhydric alcohol fatty acid ester, and others Specific examples of surfactants that can be employed include but are not limited to Pluronic P84, PE6100, PE6800, L121, Emulan EL, Lutensol FSA10, Lutensol XP89 all from BASF, MP5490 from Michelmann, AEROSOL OT (sodium di-2-ethylhexylsulfosuccinite), BARLOX 12i (a branched alkyldimethylamine oxide), LAS (linear alkylbenzene sulfonates) and TRITON 100 (octylphenoxypolyethoxy(9-10) ethanol), TWEEN surfactants like TWEEN 100 surfactant, and BASF pluronic surfactants and others. A general class is glycols, alkoxylates polyoxyalkylene fatty ethers, such as polyoxyethylene fatty ethers, sorbitan esters, mono and diglycerides, polyoxyethylene sorbitol esters, polymeric surfactants like Hypermen polymer surfactants, sodium coco-PG-dimonium chloride phosphate and coamidopropyl PG-dimonium chloride phosphate, phosphate esters, polyoxyethylene (POE) fatty acid esters, Renex nonionic surfactants (nonionic esters formed by reaction of ethylene oxide and unsaturated fatty acids and heterocyclic resin acids.), alcohol ethoxylates, alcohol alkoxylates, ethylene oxide/propylene oxide block copolymers, polyoxyethylene derivatives of sorbitan esters or combinations thereof.

In one embodiment, the composition consists of, consists essentially of, or comprises: (i) an aerogel component; (ii) a surfactant and (iii) a binder.

Inorganic as well as organic binders can be employed. Specific examples of binder materials include but are not limited to cement, lime, gypsum, hydrotalcites, mixed magnesium salts, silicates, e.g., sodium silicate, plaster, acrylates and other latex compositions, epoxy polymers, polyurethane, polyethylene polypropylene and polytetrafluoroethylene polymers, e.g., those available under the designation of Teflon™.

In many examples, the binder is a material that, under certain conditions, sets, hardens or becomes cured. For convenience, these and similar such processes are referred to herein as "drying". Preferably, these "drying" processes are irreversible and results in a solid material that includes the aerogel component and the binder.

Cements often include limestone, clay and other ingredients, e.g., hydrous silicates of alumina. Hydraulic cements, for instance, are materials that set and harden after being combined with water, as a result of chemical reactions with the mixing water, and that, after hardening, retain strength and stability even under water. The key requirement for this strength and stability is that the hydrates formed on immediate reaction with water be essentially insoluble in water. Setting and hardening of hydraulic cements is caused by the formation of water-containing compounds, which form as a result of reactions between cement components and water. The reaction and the reaction products are referred to as hydration and hydrates or hydrate phases, respectively. As a result of the immediate start of the reactions, stiffening can be observed which is initially slight but which increases with time. The point at which the stiffening reaches a certain level is referred to as the start of setting. Further consolidation is called setting, after which the hardening phase begins. The compressive strength of the material then grows steadily, over a period that ranges from a few days in the case of "ultra-rapid-hardening" cements to several years in the case of ordinary cements.

Gypsum plaster is a type of building material based on calcium sulfate hemihydrate ($CaSO_4.0.5H_2O$). Typically plaster starts as a dry powder that is mixed with water to form a paste which liberates heat and then hardens. Unlike mortar or cement, plaster remains quite soft after drying, and can be easily manipulated with metal tools or sandpaper. Lime plaster is a mixture of calcium hydroxide and sand (or other inert fillers). Carbon dioxide in the atmosphere causes this type of plaster to set by transforming the calcium hydroxide into calcium carbonate.

Many organic binders can become set or hardened through polymerization or curing processes, e.g., as known in the art.

The binder can be combined with the aerogel component in any suitable ratio. Examples include but are not limited to aerogel to binder volume ratios within the range of about 150 to about 5, preferably within the range of from about 150 to about 10, more preferably in the range of 90 to 30.

In one implementation, the surfactant and/or binder is/are employed to bind together aerogel layers, e.g., blankets or sheets such as described above, to form a multilayered composite.

In some examples of the invention, a material can be selected to act as a binder and to also provide surface active properties. Preferred examples of such materials include acrylates.

In some implementations of the invention, either the surfactant, or the binder, or both are provided in a formulation such as a mortar formulation, e.g., a grout formulation, a plaster formulation, and any combination thereof.

Mortars are agents used to bond bricks, stone, tiles, concrete blocks and the like into a structure and typically include sand and cement, e.g., masonry, Portland cements, oxychloride cements, and others. With water, the sand-cement mixture forms a plastic, workable mixture that later sets or hardens. In general, mortars function with a calcium silicate-based chemistry similar to that of concrete but, unlike concrete, they tend not to include coarse aggregates. A thin mortar, e.g., of cement, lime, or gypsum, often with other ingredients such as sand and water, used in tile work or to fill crevices such as found in masonry joints or other fissures, in order to consolidate adjoining parts into a solid mass, often is referred to as "grout".

Plaster generally refers to a mixture of gypsum or lime with sand that, with water, forms a paste-like material which can be applied in its plastic state directly to bricks or to other surfaces used for ceilings, interior walls or to the exterior of buildings, in which case it is also known as "stucco". As water evaporates the material forms a hard lining onto the surface being covered or coated.

Mortar, e.g., grout, formulations as well as plaster formulations often include additional compounds that serve as accelerators, retarders, plasticizers, air entrainment compounds, pigments, binders, pumping aids and so forth.

Accelerators, for instance, speed up the hydration (hardening) of the concrete. Examples of typical materials used are $CaCl_2$ and NaCl. Retarding agents slow the hydration of concrete, and are used in large or difficult pours where partial setting before the pour is complete is undesirable. A typical retarder is sugar ($C_6H_{12}O_6$).

Air entrainment agents add and distribute tiny air bubbles in the concrete, which will reduce damage during freeze-thaw cycles, thereby increasing the concrete's durability. Often, entrained air presents a trade-off with strength, as each 1% of air may result in 5% decrease in compressive strength.

Plasticizers (water-reducing admixtures) increase the workability of plastic or "fresh" concrete, allowing it to be placed more easily, with less consolidating effort. Superplasticizers (high-range water-reducing admixtures) are a class of plasticizers which have fewer deleterious effects when used to significantly increase workability. Alternatively, plasticizers can be used to reduce the water content of a concrete (and have been called water reducers due to this application) while maintaining workability. This improves its strength and durability characteristics.

Pigments can be used to change the color of concrete, for aesthetics. A typical example is titanium dioxide ($TiO_2$). Corrosion inhibitors are used to minimize the corrosion of steel and steel bars in concrete. Bonding agents are used to create a bond between old and new concrete. Pumping aids improve pumpability, thicken the paste, and reduce dewatering (the tendency for the water to separate out of the paste).

Other compounds that can be present in the mortar, e.g., grout, or plaster formulation include tensides, cellulose, organic polymers, e.g., acrylates, and so forth.

Suitable mortar, e.g., grout, or plaster formulations that can be utilized include those commercially available for specific application such as, for instance, joining dry wall panels, tile or brick work, façade covering, interior or exterior plastering jobs and many others, as known in the art. In one implementation, the mortar (grout) formulation is a formulation in accordance with European Standard EN 13888. One example is a grout formulation available in Europe under the designation "Fugenweiβ" (Mortier de jointoiement blanc or Impasto sigillante per giunti blanco) manufactured by SAKRET Trockenbaustoffe Europa GmbH & Co. KG, Otto-von-Guericke-Ring 3, D-65205 Wiesbaden, Germany. Another suitable grout formulation that is commercially available is a grout polyblend from Custom Building Products, USA. Customized mortar, e.g., grout, or plaster formulations also can be employed. Simplefix Premixed Adhesive and Grout, manufactured by Custom Building Products, CA, USA, Waterplug Hydraulic Cement, manufactured by Thoro Consumer Products, BASF Construction Chemicals, OH, USA, Elmer's Probond Concrete Bonder, manufactured by Elmer's Products, Inc., OH, USA, Thorocrete, manufactured by Thoro Consumer Products, BASF Construction Chemicals, OH, USA are other non-limiting examples of grout formulations that can be employed.

Combinations of a binder and a binder-containing formulation such as a mortar, plaster or grout formulation can be employed. To simplify preparation, the number of components employed can be reduced and in some embodiments, the composition includes (i) either an inorganic binder, e.g., a cement or (ii) an inorganic binder-containing formulation, e.g., a grout, mortar or plaster formulation, such as described above, but not both.

Optionally, the composition can include other ingredients. As used herein, the terms "another ingredient" or "other ingredients" refer to compounds or materials that are external to the aerogel component employed to form the composition. For example, if Nanogel® aerogel particles are utilized, the term "other ingredient" refers to ingredients that can be combined with the Nanogel® aerogel particles being used, rather than to ingredients already present in or at the surface of the Nanogel® aerogel particles. Generally, the term also refers to materials that are not already present in a binder-containing formulation, e.g., a grout, plaster or mortar formulation, in instances in which such a formulation is being utilized.

These other ingredients can be used to provide reinforcement to a final product, to wet the outer surface of aerogel particles, to increase adhesion to a substrate, rendering the composition more likely to stick to a surface, to provide or enhance other characteristics desired in the composition or a finished article employing it or for other reasons.

Examples of other ingredients that can be employed include but are not limited to opacifiers, viscosity regulators, curing agents, agents that enhance or slow down the rate at which the binder hardens, agents or materials that promote mechanical strength, viscosity regulators, plasticizers, lubricants, reinforcements, fire retardants, and many others. Combinations of ingredients also can be utilized. Amounts employed may depend on specific applications and other factors.

In preferred implementations, the composition includes an aerogel component, a surfactant, a binder, (or a material that has both binding and surface active properties) and one or more other ingredients, at least one of which is selected from the group consisting of silica, including but not limited to fumed silica, colloidal silica or precipitated silica, opacifiers, including but not limited to carbon black and titanium dioxide, perlite, microspheres such as glass or polymeric microspheres, silicates, e.g., calcium silicate, copolymers, tensides, mineral powder, film building components, surfactants, fibers and any combination thereof.

In other specific examples, the composition includes an aerogel component a surfactant a binder (or a material that has both binding and surface active properties), and another ingredient that consists, consists essentially of, or comprises fibers. Fibers typically have elongated, e.g. cylindrical, shapes with length to diameter aspect ratios that are greater than 1, preferably greater than 5, more preferably greater than 8. In many examples suitable fibers have a length to diameter ratio of at least 20. The fibers can be woven, non-woven, chopped, or continuous. Fibers can be mono-component, bi-component, e.g., including a core made of one material and a sheath made of another material, or multi-component. Fibers may be hollow or solid and may have a cross-section that is flat, rectangular, cylindrical or irregular. The fibers may be loose, chopped, bundled, or connected together in a web or scrim.

In embodiments according to the inventions where fibers are used, the fibers may be inorganic fibers such as mineral wool fibers, e.g., glass, stone or slag fibers; bio-soluble ceramic fibers; or a woven, non-woven or chopped form of continuously made glass or stone fiber. A specific example of a suitable type of fiber is available under the designation of RB260 from Rockwool International A/S, Denmark.

In some instances, the amounts of fibers, measured in amounts relative to the total weight of the composition, e.g. dry mixture, slurry, paste, composite, e.g., self supporting rigid composite or solid composite, and so forth, are greater than 0%, e.g., greater than 2%, preferably greater than 5%, and less than 25%, for example less than 20% , for instance less than 15% or less than 10% by weight. In other instances, these fibers are present in an amount of at least 25% by weight, for example more than 40%. In specific implementations these fibers are present in the composition in an amount that is at least 25% by weight and less than about 90% by weight, e.g., less than 75% by weight or less than 50% by weight. In some embodiments, the amounts described above reflect amounts of fibers external to the aerogel component, e.g., added to the aerogel component to form the composition. In other embodiments, the amounts described above reflect fiber amounts that are external to the aerogel component, together with fiber amounts that may already be present in the aerogel component.

Other examples of fibers include carbon fibers, polymer-based fibers, metallic, e.g., steel, fibers, cellulose fibers, plant-derived, e.g., cotton, wood or hemp fibers. Such fibers can be included in the composition described herein, e.g., e.g. composite, slurry, paste, self supporting rigid composite, solid composite, and so forth, in amounts greater than 0 weight %, e.g., greater than 2 weight %, for example greater than 5 weight %, greater than 10 weight %, greater than 20 weight % or greater than 25 weight %. These fibers can be present in the composition in amounts that are less than about 90% by weight, e.g., less than about 75 weight % or less than 50% by weight.

Combinations of fibers also can be employed.

In some embodiments of the invention, the composition does not include fibers. If used, fibers can increase mechanical properties of a finished product but may also contribute to a loss of thermal insulation. Other ingredients such as mesh or skin can be added to provide reinforcement.

In some embodiments the composition is in the form of a dry mixture or blend. To form a dry mixture, the aerogel component, surfactant, binder and, optionally, one or more other ingredient(s) such as, for instance, fibers, can be combined in one step or in a desired order and blended together. Dry precursor mixtures can be formed by combining two or more of the components being employed. If desired, separate components or separate precursor blends can be made available, for instance in a kit.

Ingredients and/or precursor mixtures can be added together in a one step process or in a desired order and mixed to form a dry blend utilizing, for example, mixing techniques and/or equipment known in the art.

In other embodiments, the composition includes a fluid, preferably a liquid, such as, for instance, water or a water-containing phase. The liquid phase also can consist of, consist essentially of or can include one or more materials other than water, such as, for instance, one or more organic solvents. For convenience, a liquid or liquid-containing composition is generally referred to herein as a "slurry" and, as used herein, the term "slurry" is meant to include solutions, dispersions, suspensions, pastes and so forth.

In one example, the aerogel component is added to an aqueous phase of surfactant. Other components such as, for instance, a binder and/or fibers can be added prior to and/or during the introduction of the aerogel component. The aerogel component also can be added to a slurry that includes a binder.

With solid binders, water solutions of the solid binders can be used or can be generated during the preparation process. When combined with hydrophobic aerogel, aqueous binder solutions have the advantage of not infiltrating the pores of the aerogel. In many cases, a dispersion or suspension of the aerogel component in water is facilitated by the presence of a mortar, e.g., grout, or plaster formulation such as described above. Preferably, a slurry that includes particulate aerogel and a binder such as present in a grout formulation, is homogeneous and has well dispersed aerogel and/or binder.

In specific examples, another ingredient, e.g., fibers, is added to the fluid phase to form a dispersion, suspension or solution which is then combined or incorporated into a slurry precursor or a dry precursor containing the aerogel component. If fibers are employed, adding them to a slurry or a liquid precursor can facilitate their dispersion.

Amounts employed can be selected based on the nature of the materials employed, e.g., particle size or surface area available for exposure to water, air, surfactants and so forth, on mixing techniques, time interval to the setting point of the composition, desired viscosity of the slurry prior to setting, and other parameters.

In some implementations, the composition includes for example, 70 or 75% by weight Nanogel® type aerogel and 25 or 30% by weight of a grout formulation such as described above. Specific examples of the Nanogel® type aerogel are those available under the designation of TD302, mixtures of TD302 and TLD203 and so forth. Amounts of water added can be selected based on the desired viscosity of the slurry, desired application and/or other factors. For example, a slurry can include 40% by weight Nanogel® type aerogel, 10% by weight grout formulation and 50% by weight water.

Surface active agents, pH modifier and other materials can be introduced to tailor slurry properties. Slurry viscosity for instance, can be controlled by the amount of liquid added, mechanical manipulation, addition techniques, e.g., order of added components, continuous, intermittent or a one-step combination of an entire amount of dry and fluid phases, the presence of thinners, and other means known in the art. In many cases the slurry is thixotropic, in other words it becomes more liquid-like (less viscous) under shear forces.

In a specific implementation, a slurry precursor has a high pH, such as, for instance, at least 10 and preferably at least 13. In other examples, the composition is a water-based slurry having a pH of about 10, preferably about 13, and includes the aerogel component. In some embodiments, the high pH composition includes an aerogel component and a surface active agent, e.g., Pluronic P84 or another suitable surfactant such one of those described above.

In one embodiment of the invention the composition is formed by combining an aerogel component and a high pH liquid that typically is water. In specific examples, the composition includes the aerogel component, e.g., granular aerogel, and water at a pH of at least 10 and preferably higher, e.g., 13. In specific implementations a surfactant also is present. A binder and/or other ingredients, e.g., fibers, can be incorporated as well. In some implementations, the composition can consist of, consist essentially of or can include the aerogel component, high pH water and a compound or material that has binding as well as surface active properties. In one embodiment, the composition consists of, consists essentially of or includes the aerogel component, high pH water and an acrylate, the acrylate being thought of having surface active properties as well as binding properties. In another embodiment, a composition consists of, consists essentially of or includes the aerogel component, high pH water, and fibers. In a further embodiment, the composition consists of, consists essentially of or includes the aerogel component, high pH water, and a binder or a binder-containing formulation. In yet another embodiment, the composition consists of, consists essentially of or includes the aerogel component, high pH water, a surfactant and fibers.

In some instances, the slurry includes additional ingredients that can speed up or retard drying, e.g., curing or hardening of the binder.

Shaking, stirring and/or other techniques can by employed to mix liquid and solid materials. In specific examples, light particles, e.g., aerogel particles, are forced into a liquid phase. In other examples, water droplets are lifted to the lighter particles.

Mixing can be effected by manual stirring or in blenders or mixers such as, for example, cement mixers, hand-held impellers, ribbon blenders and others. Mixers such as those having double ribbon blades, planetary mixers and so forth can be utilized. In some cases, blade design and/or properties, e.g., increased blade sharpness, can reduce the amount of time necessary to complete the mixing process and, in some cases, the properties of the final product.

Parameters such as mixing speed, temperature, degree of shear, order and/or addition rate of the liquid and/or solid materials, and many others can be adjusted and may depend on the scale of the operation, the physical and/or chemical nature of the compounds, and so forth. Mixing techniques can also change the size distribution of the aerogel particles resulting in various packing efficiencies in the resulting composite.

Mixing can be conducted at room temperature or at other suitable temperatures. Typically, the components are combined in ambient air but special atmospheres can be provided.

In yet other embodiments of the invention, the composition is a solid. Through appropriate physical and/or chemical process(es), referred to herein as "drying" and including, for instance, polymer curing, cement hardening, water evaporation and so forth, a slurry such as described above gives rise to a composite that includes the aerogel component. As used herein, the term "composite" refers to a material which has structural or functional properties that differ from the properties of the substances employed to form the composite. Preferably, the composite also includes, a surfactant and/or a binder and, optionally, other ingredients, e.g., fibers.

Parameters, such as temperature, time, drying conditions, humidity, soaking and ramping protocols, special atmospheres, the nature of agents employed to influence these processes, and others, can be adjusted and optimized as known in the art or as determined by routine experimentation.

In many cases, the slurry dries at room temperature but setting or hardening the slurry also can be carried out at temperatures higher than room temperature, for instance by placing the slurry in an oven, e.g., at a temperature in the range of from about 30° C. to about 90° C. Drying can take as little as a few minutes or a longer time interval and compositions can be formulated for shorter or longer setting times to address specific applications. In many instances, the slurry sets in a time interval within the range of from about 5 min to about 24 hours, e.g., about half an hour.

The composite can be subjected to further aging and/or bake cycles and to further processing, e.g., further shaping, polishing and so forth, to produce a finished article.

The composite can be formed to have a specific permeability. In many cases, the composite is hydrophobic and can have a desired water repellency, contact angle, water soaking or water adsorption properties.

In some implementations of the invention, the composite is formed by using water at a high pH, e.g., at least pH 10 and preferably higher, for instance about at least 13. Examples of such a self supporting composite include an aerogel component and fibers, for instance mineral wool fibers. If added, surfactant materilas can enhance wetting of the aerogel particles.

In other implementations, the composite consists of consists essentially of or comprises an aerogel component and one or more polymers. Acrylates, for instance, can influence the mechanical properties of the solid product, e.g., flexibility, tensile strength, failure strength and so forth. In specific examples the binder is a styrene acrylic copolymer, such as available under the designation of Vinnapas, from Wacker Polymer Systems, GmbH & Co. KG, Johannes Hess Strasse 24, 84489 Burghausen, Germany.

In specific embodiments, the solid composite is rigid. Generally, rigid objects undergo no visible deformation under the force of their own weight. In other specific embodiments, the composite is self supporting, i.e., capable of sustaining or carrying its own weight, and, in specific implementations of the invention, it is derived from a moldable precursor. For example, a slurry, e.g., a paste, can be shaped using a suitable mold followed by a hardening process such as curing or a process involving cement or plaster hardening chemistry. Optionally, the hardened product can be dried, e.g., at room temperature or in an oven before or after removal from the mold and can be further processed by additional shaping, polishing or other step(s). Self supporting composites also can be prepared by sculpting or by using an extruder. A photograph of a self-supporting rigid composite according to one embodiment of the invention is shown in FIG. 1.

In other implementations, a composite in the form of a coating is produced by applying the slurry to a substrate, e.g., a wall, ceiling, door, frame, piping, dry wall, facades, insulation boards such as for example, mineral wool boards or bats, finished articles and many other types of surfaces and allowing the slurry or paste to dry (harden), forming a composite coating onto the substrate. Application of a slurry or paste onto a substrate may depend on viscosity considerations and other factors and may include painting, spraying, pumping and so forth. Painting, spraying and other techniques can be employed. In some applications, the slurry is applied to a substrate by pumping it through one or more conduits such as hoses or pipes. In others, the slurry is sprayed, e.g., onto a surface or into a cavity or crack. In further applications the slurry or paste is painted. The slurry or paste also can be molded, sculpted, cast or extruded to obtain a shaped article.

A composite also can be formed by pumping or spraying a slurry within an enclosure, e.g., for insulating purposes in construction spaces or other applications.

In specific aspects, the invention relates to a composite that has specific properties such as thermal conductivity, mechanical, acoustical, fire resistance and/or other useful characteristics. The composite preferably is self supporting and includes an aerogel component, e.g., in granular form. The composite can also include a surfactant, binder and/or other ingredients. In some examples, the composite is formed by treating the aerogel component with high pH water. In other examples, the composite includes an aerogel component and an acrylate.

In specific embodiments invention is directed to a composite that preferably is rigid and/or self-supporting and has a low thermal conductivity, e.g., a thermal conductivity that is no greater than 50 mW/m-K at 23° C., preferably no greater than about 30 mW/m-K and preferably no greater than about 20 mW/m-K, as measured by American Standard Test Method (ASTM) C518 (Standard Test Method for Steady-State Thermal Transmission Properties by Means of the Heat Flow Meter Apparatus). Thermal conductivity is an intrinsic property of a material that measures its capacity to sustain heat flow. The symbol used to denote thermal conductivity is k (or lambda, $\lambda$). The reciprocal of thermal conductivity is thermal resistivity, an intrinsic property of a material to resist one-dimensional heat flow. Thermal resistivity has units of m-K/mW (meter times Kelvin devided by milliwatts. Preferably, the composition is made utilizing particulate aerogel. In specific examples, the composition has a thermal conductivity that is within the range of from about 20 mW/m-K to about 30 mW/m-K.

Since air has a thermal conductivity of 26 mW/m-K, the presence of air in an ultra-low lambda composite will degrade its thermal performance. In some implementations, the composite includes an aerogel component that is efficiently packed. In specific examples, air is present in an amount no greater than about 40% volume/volume. Preferably air is present in an amount of less than about 30 volume %, more preferably less than about 20% by volume. Methods that result in a reduction in the air volume fraction in the final composite include particle size distribution (PSD) selection/creation, vibratory packing, vacuum packing, use of defoaming agents and others. Use of a wide PSD with the ratio of small and large particles will facilitate efficient packing Spherical or nearly spherical particles can be combined with particles that are non-spherical such as randomly shaped or elongated particles. The PSD can be introduced with the starting aerogel material or can be created during the process of mixing, e.g., by using high shear mixing.

The density of the solid composite often will depend on the additives added. The presence of high density ingredients such as $TiO_2$ or some types of fibers, for instance, can result in an increase in the density of the composite, compared to a similar composite prepared without these ingredients. Composites, e.g., self-supporting rigid composites, of the invention can have a density within the range of from about 0.06 to about 0.35 g/cm$^3$, preferably within the range of from about 0.08 to about 0.25 g/cm$^3$ and more preferably in the 0.1 to 0.15 g/cm$^3$. In other examples, the density of the composite is no greater than about 2.5 g/cm$^3$, preferably no greater than 1.5 g/cm$^3$ and more preferably no greater than 1 g/cm$^3$.

A self supporting composite according to the invention can have mechanical properties suitable for specific applications. In specific examples, molded composites have a compressive strength within the range of from about 0.05 MPa to about 0.3 MPa and a flexural strength of up to about 0.05 MPa, e.g., as measured by guidelines set in ASTM C203. In other cases, molded composites have different mechanical properties.

In many cases, the solid composite has flame resistance and/or fire proofing properties. In specific examples, a composite material includes aerogel blankets laminated together into a multilayered composite that has fire resistant properties. Additional fire-retardants or intumescent materials can be introduced on a multi-layered composite.

In other instances, a composite such as the self-supporting rigid composite described above can be used over a significant range of temperatures, e.g., from cryogenic or low temperatures to high temperatures.

The composite also can have good acoustical insulation properties.

Without wishing to be held to any particular interpretation of the mechanisms involved, it is believed that one or more factors can contribute forming a homogeneous mixture. For example, it is believed that polymeric additives present in a binder-containing formulation, e.g., a grout formulation, act as surface active agents enhancing the compatibility between aqueous dispersions and many aerogel materials. Particles present in binder-containing formulation also can have surface active properties, thereby mediating the aerogel and aqueous phases. High viscosity build-up upon cement hydration can facilitate physical mixing and increasing the pH is believed to decrease hydrophobicity at the aerogel surface and, in some cases, render this surface hydrophilic.

Bonding is thought to contribute to self-supporting properties and this bonding may be promoted or enhanced by reactions between $CaCO_3/CaO$ components in binder-containing formulations and silica surfaces of some types of aerogel, with the possible formation of calcium-silicate-hydrates. Cements are believed to form a matrix around aerogel particles, thereby holding these particles.

Ultra-low thermal conductivities observed with compositions, e.g., composites, disclosed herein is believed to be promoted or enhanced by shearing of particles during mixing to create a broad particle size distribution (PSD). In turn a broad PSD results in a more efficient packing of particles. In some aspects of the invention, the binder is present in a low volume fraction and does not percolate. In other aspects the binder is present at higher levels and percolates. In addition, some inorganic binders have inherent opacifying properties that interfere with IR transmission through the composite.

The composition disclosed herein can be utilized in instances similar to those requiring conventional mortar, plaster, grout and the like. In other applications, the composition, e.g., as a dry blend or slurry, can be incorporated in raw materials employed to manufacture bricks, dry wall, siding or roofing materials, tiles, ceiling tiles, paints and so forth. Paint or coating applications may benefit from milling to a fine powder, for example to avoid surface texture. The milled particle size preferably is equal or smaller than the coating thickness.

Compositions of the invention that are sticky can be used to fill in gaps or crevices against insects or vermin. If the remaining surface is hydrophobic, it will kill insects that crawl on the surface by removing their fat shield, so that they dry out and die. In many implementations, the composition described herein has hydrophobic properties which can be exploited in façade work, showers, and other humid environments.

In other applications, the composition can be shaped to form a rigid, self supporting article or a part thereof.

The following examples are illustrative and are not intended to be limiting.

COMPARATIVE EXAMPLE 1

Nanogel aerogel TD302, grout, cement and acrylate were combined and placed in a mold where they were allowed to harden at room temperature for about 30 minutes. They were removed from the mold and subjected to thermal conductivity measurements on Lambda-Control A 50 apparatus from Hesto Electronik GmbH, Germany. The cold and hot plates were kept at 10 deg C. and 36 deg C. respectively and mean temperature was 23° C. The proportions (by weight) employed and the thermal conductivity (lambda in mW/m·K values measured are shown in Table I:

TABLE I

| Cement | Grout | Acrylate | Aerogel TD302 | Thermal Conductivity at 23° C. |
|--------|-------|----------|---------------|-------------------------------|
| 0.24   | 0.28  | 0.15     | 0.33          | 29.5                          |
| 0.20   | 0.24  | 0.13     | 0.42          | 24.7                          |
| 0.38   | 0.21  | 0.11     | 0.30          | 34.8                          |

EXAMPLE 2

Nanogel® aerogel TD302, from Cabot Corporation and a second component that included grout were combined with water. Specifically 160 g water were combined with 70 grams Nanogel® aerogel and 23 g Fugenweiß grout formulation, manufactured by SAKRET Trockenbaustoffe Europa GmbH & Co. KG, Otto-von-Guericke-Ring 3, D-65205 Wiesbaden, Germany. The combined ingredients were mixed vigorously for a short interval with a hand-held drill equipped with a cement mixing paddle to form a paste or slurry which appeared homogeneous, and sticky. The slurry was made more fluidic by vibration or shearing.

The slurry was placed in a mold to make a tile in a brick-like shape suitable for thermal conductivity measurements and placed in an oven at 85 degrees Centigrade (° C.) for 36 hours. The thermal conductivity for the resulting hardened composition was measured by Lambda-Control A 50 apparatus from Hesto Electronik GmbH, Germany. The cold and hot plates were kept at 10 deg C. and 36 deg C. respectively and mean temperature was 23° C. The lambda measured was 15.5 mW/(m·K).

EXAMPLE 3

In a further example, 150 g water, 90 g Nanogel™ aerogel designated TLD302 and 30 g Fugenweiß grout formulation were combined to form a slurry. The slurry was placed in a mold to make a tile or frame in a brick-like shape suitable for thermal conductivity measurements and placed in an oven at 45 degrees Centigrade (° C.) for 48 hours. The resulting self-supporting composite was measured for thermal conductivity using a Lambda-Control A 50 apparatus from Hesto Electronik GmbH, Germany. The cold and hot plates were kept at 10 deg C. and 36 deg C. respectively and mean temperature was 23° C. and the lambda was determined to be 14.6 mW/m-K.

EXAMPLE 4

200 g water, 169 g Nanogel™ aerogel designated TLD302 and 41 g Fugenweiß grout formulation were combined and mixed to form a slurry. The slurry was placed in a mold to make a tile or frame in a brick-like shape suitable for thermal conductivity measurements and placed in an oven at 45 degrees Centigrade (° C.) for 48 hours, resulting in a self supporting composite with lambda of 14.4 mW/m-K. Measurements were performed on a Lambda-Control A 50 apparatus from Hesto Electronik GmbH, Germany. The cold and hot plates were kept at 10 deg C. and 36 deg C. respectively and mean temperature was 23° C.

EXAMPLE 5

Several samples were produced using the ingredients listed in Table 2, below. The aerogel used was translucent aerogel designated as Nanogel™ TLD302, obtained from Cabot Corporation, Billerica, Mass. The grout formulation was Laticrete Beige Grout, obtained from LATICRETE International, Inc., CT, USA. The surfactant was obtained from BASF, USA under the designation of Pluronic P84, which is a ethylene-oxide and propylene oxide copolymer based non-ionic surfactant. Fibers used were Rockwool fibres (RB260) from Rockwool International, Denmark, Belcotex type glass fibers were obtained from Lauscha Fiber International, SC, USA. 0.1M Solutions of Sodium Hydroxide (NaOH) from Aldrich Chemicals, USA were used as pH 13 water solutions. A 50% g/g solution of Pluronic P84 in de-ionized water (DI water) was made for ease of use. Calcium sulphate hemi-hydrate and Sodium silicate were obtained from Aldrich Chemicals, USA Paste or slurry mixtures, formed using the specific combinations shown in Table 2 were placed in a stainless steel mold having dimensions of 8×8 inches (204 mm×204 mm) and dried overnight at 85° C. The thermal conductivity was measured on a Lasercomp Model Fox 200 from LaserComp, Inc, MA, USA. The machine complies with ASTM C518. The mean temperature of the measurement was 25° C. and the bottom and top plates were kept at 38 ° C. and 12° C. respectively.

Specific details regarding the preparation of the samples are as follows.

Sample 5A was produced by adding water to a mixing container and the mixer, an overhead mixer with a double helical attachment was started at 750-800 rpm. A dry mix made of aerogel TLD302 and Laticrete Beige Grout was slowly added to water. Each addition lowered rpm by 40-50 rpm. Once the rpm was back up to the original rpm, another addition was made. As more was added, the mixer speed needed to be increased to keep at original rpm value. The resulting homogeneous mixture was placed in the mold and dried overnight.

Samples 5B, 5C were prepared by adding water, TLD302 aerogel and Laticrete Beige Grout, in that order, to a mixing container. A hand drill with the double helical mixing attachment was used. Mixing was started at 400 rpm for 30 seconds, increased to 1400 rpm for 30 seconds and decreased to 400 rpm for another 30 seconds. The resulting homogeneous mixture was placed in the mold and dried overnight. Sample 5D was prepared by adding water, CBTLD103 aerogel, which is a blend of Carbon Black and Nanogel aerogel; and Laticrete Beige Grout, in that order, to a mixing container. A hand drill with the double helical attachment was used. Mixing was started at 400 rpm for 30 seconds, increased to 1400 rpm for 30 seconds and decreased to 400 rpm for another 30 seconds. The resulting homogeneous mixture was placed in the mold and dried overnight.

Sample 5E was prepared by placing water and surfactant solution in a mixing container. Fibres were added slowly until a homogeneous viscous liquid was formed.

The mixer used was an overhead mixer with a double helical attachment. Its speed was increased to 850-900 rpm. TLD302 was added slowly and the RPM lowered by 40-50 with each addition. The resulting homogeneous mixture was placed into the mold and dried overnight. An integral composite of aerogel and fibers was obtained that showed a degree of delamination.

Sample 5F was prepared starting with water, surfactant solution and sodium silicate solution that were added to a mixing container. The mixer (an overhead mixer with double helical attachment) was started (750-800 rpm). Fibres were added slowly until a homogeneous viscous liquid was formed. TLD302 aerogel was added slowly and the mixing speed was lowered by 40-50 with each addition. The homogeneous mixture obtained was placed in the mold and dried overnight. An integral composite of aerogel and fibers was obtained.

For sample 5G, water and surfactant solution were added to a mixing container. Fibres were added slowly until a homogeneous viscous liquid was formed.

The rotation speed of the mixer (an overhead mixer with double helical attachment was increased to 850-900 rpm. A dry mix of TLD302 aerogel and calcium sulphate hemihydrate was made and added slowly. The mixer speed was lowered by 40-50 with each addition. The homogeneous mixture obtained was placed in a mold and dried overnight. An integral composite of aerogel and fibers was obtained.

The thermal conductivity of samples 5A through 5D was measured and the results are shown in Table II.

TABLE II

| Sample # | DI H2O (g) | pH 13 H2O (g) | TLD302 (g) | Laticrete Beige Grout (g) | RB 260 (g) | 50% P84 (g) | Calcium Sulphate Hemihydrate (g) | Sodium Silicate (g) | λ (mW/mK) |
|---|---|---|---|---|---|---|---|---|---|
| 5A | 206.1 | | 90 | 29.7 | | | | | 17.7 |
| 5B | 200 | | 169 | 41 | | | | | 16.9 |
| 5C | 150 | | 90 | 30 | | | | | 16.4 |
| 5D | 150 | | 90 (CB) | 30 | | | | | 18.0 |
| 5E | | 200 | 45 | | 90 | 5.4 | | | |
| 5F | | 200 | 45 | | 90 | 2.7 | | 11.3 | |
| 5G | | 200 | 45 | | 90 | 2.7 | 11.3 | | |

EXAMPLE 6

Scanning electron micrographs of a grout-aerogel composite made by a method such as described with respect to Sample 5B is shown in FIG. 2. Shown in FIG. 3 is a scanning electron micrograph of an aerogel-mineral fiber composite prepared using water at high pH as described with respect to Sample 5E.

EXAMPLE 7

The thermal conductivity of a self supporting rigid composite prepared from Acronal 10 wt %, Nanogel™ aerogel 50wt %, cement 15wt %, fibers 25wt % was 20.2 mW/(m K). Measurements were performed on a Lambda-Control A 50 apparatus from Hesto Electronik GmbH, Germany. The cold and hot plates were kept at 10 deg C. and 36 deg C. respectively and mean temperature was 23° C.

EXAMPLE 8

Rockwool RB260/Nanogel composites were made by the following method. Water and surfactant were added to a secured plastic container. The overhead mixer with double helical attachment was started. The speed was adjusted to 200-300 rpm. RB260 was slowly added. A dry mix of Nanogel and dry binder (here, Calcium Sulphate Hemihydrate) was prepared. The speed of the mixer was increased to ~350 rpm and the dry mix of Nanogel and binder was slowly added. Mixing continued until a homogenous paste-like mixture was obtained. The mixture was then poured into rectangular and circular molds. These were subjected to drying overnight ~16 hr in a 85° C. oven. The ratios of the binder to aerogel and aerogel to fibers are given in Table III below. The thermal conductivity was measured on a Lasercomp Model Fox 200. The mean temperature of the measurement was 23° C. and the bottom and top plates were kept at 36° C. and 10° C., respectively. Compressive strength determinations were performed on a circular cast and measured on an Instron model 4204.

The values determined for various paramaters noted are given in Table III.

dispersed, when <2 g more of the chopped fiber were added. Mixing was continued until a well dispersed product was obtained and the addition(s) of fibers was repeated until the whole needed amount of fibers have been added. Once all fibers have been mixed, the glass fiber solution was poured the into a plastic screw-top bottle and surfactant was added to the bottle and shaken to re-disperse the fibers. The resulting fiber/surfactant mixture was transferred to a secured plastic container and additional water (50-100 mL per recipe) was added to the plastic container. Nanogel™ type aerogel and binder were added to plastic container. For samples 9A and 9B, an overhead mixer with double helical attachment was started and ingredients were mixed until a homogenous paste was obtained.

For samples 9C-9F, mixing was conducted for 2-3 minutes with double helical attachment on a hand held power drill until forming a paste-like composition. It was found that this high torque mixing apparatus (designated "drill" in the Table) facilitated mixing when higher fiber loadings were used.

The mixture was then poured into rectangular and circular molds. These were dried overnight for ~16 hr in a 85° C. oven. The ratios of the binder to aerogel and aerogel to fibre are given in Table IVA. The thermal conductivity was measured on a Lasercomp Model Fox 200. The mean temperature of the measurement was 23° C. and the bottom and top plates were kept at 36° C. and 10° C. respectively. Compressive strength measurements were performed on a circular cast and mea-

TABLE III

| Sample ID | Binder | Fibre Type | Binder/ Aerogel (g/g) | Fibre/ Aerogel (g/g) | Strain at failure (%) | Comp Strength (MPa) | Compressive Modulus (MPa) | Lambda (mW/mK) |
|---|---|---|---|---|---|---|---|---|
| 8A | CaSO4 | RB260 | 0.5 | 0.3 | 16.41 | 0.088 | 0.54 | 21.6 |
| 8B | CaSO4 | RB260 | 0.125 | 0.3 | | | | 20.9 |

EXAMPLE 9

This example used chopped glass fibers to improve the mechanical properties of the composite. In all cases the type of binder employed was calcium sulfate hemihydrate. Various mixtures were made using two different set-ups.

Water (~250 mL) and <2 g of chopped glass fiber were added in a blender and the ingredients were mixed until well sured on an Instron model 4204. Various parameters and values determined are provided in Tables IVA and IVB.

Sample 9B was very weak and the sample in the mold crumbled upon heating. It is believed that this was due to the inadequate mixing. When switching to a high torque mixer, the hand held drill, the same recipe could be homogenously mixed as evidenced by the compressive strength of Sample 9C.

TABLE IVA

| ID # | DI water (g) | 50% Pluronic P84 (g) | Binder (g) | Belcotex 6 mm (g) | TLD302 (g) | Type of binder | Type of mixer | State of dried mold |
|---|---|---|---|---|---|---|---|---|
| 9A | 250.0 | 6.0 | 50.2 | 10.0 | 100.0 | Calcium Sulfate | overhead | |
| 9B | 250.0 | 6.0 | 50.2 | 30.0 | 100.0 | Calcium Sulfate | overhead | crumbled |
| 9C | 250.0 | 6.0 | 50.2 | 30.0 | 100.0 | Calcium Sulfate | drill | ok |
| 9D | 350.0 | 6.0 | 50.2 | 30.0 | 100.0 | Calcium Sulfate | drill | ok |
| 9E | 250.0 | 6.0 | 50.2 | 10.0 | 100.0 | Calcium Sulfate | drill | ok |
| 9F4 | 300.0 | 6.0 | 50.2 | 10.0 | 100.0 | Calcium Sulfate | drill | ok |

TABLE IVB

| ID # | Compressive Strength (MPa) | Conductivity (mW/mK) |
|---|---|---|
| 9A | 0.136 | 23.5 |
| 9B | | |
| 9C | 0.142 | |
| 9D | 0.083 | 26.7 |

TABLE IVB-continued

| ID # | Compressive Strength (MPa) | Conductivity (mW/mK) |
|---|---|---|
| 9E | 0.122 | 21.7 |
| 9F | | 25.8 |

EXAMPLE 10

In order to provide opacification for the composite, additional $TiO_2$ rutile was added to the mixture. Rutile $TiO_2$ had a particle size <5 microns and was obtained from Aldrich Chemicals, USA. Two different size Belcotex fibres, 6 mm and 12 mm in length, from Laushua Fibers were also used. Nanogel™ TLD100 has a broad size distribution in 0.1 to 4 mm range.

Water (~250 mL) and <2 g of chopped glass fiber were added in a blender, mixed until the fibers were well dispersed. This was followed up by addition of <2 g more of the chopped fiber. Again ingredients were mixed until a well dispersed composition. These steps were repeated until the entire amount of fibers was added. Once all fibers were mixed the glass fiber solution was poured into a plastic screw-top bottle. Surfactant and rutile $TiO_2$ was added to the bottle which was then shaken to re-disperse the fibers. The resulting fiber/surfactant/TiO2 mixture was introduced to a secured plastic container. Additional water (50-100 mL per recipe) was added to the screw-top bottle to remove any residue and the contents transferred to the plastic container. Nanogel™ aerogel, $TiO_2$ and binder were added to plastic container. In sample 10D the binder was provided by Waterplug Hydraulic Cement, manufactured by Thoro Consumer Products, BASF Construction Chemicals, OH, USA. The binder used in preparing all the other samples in this Example was calcium sulfate hemihydrate. Mixing was carried out with a handheld drill with a helical cement mixer that has a double helical attachment which was started at a slow speed (<400 rpm) for about a minute, after which the speed was increased (~400 rpm) and mixing was conducted for an additional 2-3 minutes until a paste like mixture formed.

The paste-like mixture was poured into rectangular and circular molds and dried overnight (~16 hrs) in a 85° C. oven. The thermal conductivity was measured on a Lasercomp Model Fox 200. The mean temperature of the measurement was 23° C. and the bottom and top plates were kept at 36° C. and 10° C. respectively. Compressive strength measurements were performed on a circular cast and measured on an Instron model 4204. The ratios of the binder to aerogel and aerogel to fibre, the measurements determined and values other parameters are summarized in Tables VA and VB.

TABLE VA

| ID # | DI water (g) | 50% Pluronic P84 (g) | Binder (g) | $TiO_2$ (g) | Belcotex 6 mm (g) | Belcotex 12 mm (g) | TLD100 | Density of dry sample (g/cc) |
|---|---|---|---|---|---|---|---|---|
| 10A | 350.0 | 1.0 | 50.0 | 20.0 | 33.0 | | 100.0 | 0.000 |
| 10B | 300.0 | 1.0 | 50.0 | 50.0 | 10.0 | | 100.0 | 0.203 |
| 10C | 350.0 | 1.0 | 50.0 | 50.0 | 33.0 | | 100.0 | 0.205 |
| 10D | 350.0 | 1.0 | 50.0 | 20.0 | 33.0 | | 100.0 | 0.184 |
| 10E | 350.0 | 1.0 | 50.0 | 20.0 | | 33.0 | 100.0 | 0.175 |
| 10F | 300.0 | 1.0 | 50.0 | 50.0 | | 10.0 | 100.0 | 0.210 |

TABLE VB

| ID # | Strain at break | Compressive Strength (MPa) | Compressive Modulus (MPa) | Conductivity (mW/mK) |
|---|---|---|---|---|
| 10A | 21.47% | 0.050 | 0.232 | 27.2 |
| 10B | 20.13% | 0.094 | 0.465 | 25.1 |
| 10C | 21.63% | 0.088 | 0.407 | 29.7 |
| 10D | 17.80% | 0.024 | 0.136 | 22.9 |
| 10E | 22.42% | 0.059 | 0.261 | 24.5 |
| 10F | 20.50% | 0.071 | 0.348 | |

EXAMPLE 11

In this example the binder was provided in a grout formulation, specifically Laticrete Beige Grout, obtained from LATICRETE International, Inc, CT, USA.

The samples were prepared by adding water to a plastic container, followed by surfactant solution. Nanogel® aerogel and the binder-containing formulation were then added and the ingredients were mixed with a handheld drill with a helical cement mixer for about 2 minutes resulting in a homogenous mixture that was a dry crumbly mixture.

The mixture was poured into rectangular and circular molds and dried overnight (~16 hrs) in a 85° C. oven. The thermal conductivity of the samples was measured on a Lasercomp Model Fox 200. The mean temperature of the measurement was 12.5° C. and the bottom and top plates were kept at 25° C. and 0° C., respectively. Compressive strength measurements were performed on a circular cast using an Instron model 4204. Parameters used, including ratios of the binder to aerogel and aerogel to fibers, along with the values determined for various measurements are shown in Table VI.

TABLE VI

| ID # | DI water (g) | 50% Pluronic P84 (g) | Grout (g) | TLD302 (g) | Density of dry sample (g/cc) | Compressive Strength (MPa) | Thermal Conductivity (mW/m-K) |
|---|---|---|---|---|---|---|---|
| 11A | 200.0 | 10.5 | 41.1 | 169.1 | 0.107 | 0.029 | 17.6 |
| 11B | 200.1 | 0.0 | 41.0 | 169.1 | | 0.025 | 16.64 |

EXAMPLE 12

The following binders or binder-containing formulations were tested: (a) Simplefix Premixed Adhesive and Grout, manufactured by Custom Building Products, CA, USA; (b)Waterplug Hydraulic Cement, manufactured by Thoro Consumer Products, BASF Construction Chemicals, OH, USA; (c)Elmer's Probond Concrete Bonder, manufactured by Elmer's Products, Inc., OH, USA; (d) Thorocrete, manufactured by: Thoro Consumer Products, BASF Construction Chemicals, OH, USA.

Specifically, Samples 12A and 12B used the Waterplug Hydraulic Cement. Samples 12C and 12D used a mixture of equal parts of Waterplug Hydraulic Cement and Laticrete Beige Grout, obtained from LATICRETE International, INC, CT, USA. Sample 12E utilized a 25% g/g. Elmer's Probond Concrete Bonder and 75% g/g Waterplug Hydraulic Cement. Sample 12F included a 50% g/g Elmer's Probond Concrete Bonder and 50% g/g. Waterplug Hydraulic Cement. Samples 12G used Thorocrete, while Sample 12H used Simplefix Premixed Adhesive and Grout.

To prepare the samples water was added in a plastic container, followed by surfactant solution and the two were mixed. For Samples 12C-12G no surfactant was added, since the formulation used had additives (such as polymeric additives or components) that are believed to be surface active. For sample 12H water and binder-containing formulation were pre-mixed for <1 min before addition of aerogel.

Nanogel™ aerogel and binder-containing formulation were then added and the ingredients were mixed with a handheld cement mixer for about 2 min resulting in a homogenous composition which was pumpable and stiffened on standing.

The composition was poured and pressed into rectangular and circular molds and dried overnight (~16 hrs) in an oven at 85° C. For samples 12B and 12D, the mixture paste was placed in a mold with two layers of drywall tape which had a mesh size of about 4 mm at ⅓ and ⅔ its thickness.

Thermal conductivity measurements were conducted using a Lasercomp Model Fox 200. The mean temperature of the measurement was 12.5° C. and the bottom and top plates were kept at 25° C. and 0° C. respectively. Compressive strength measurements were performed on a circular cast and were measured on an Instron model 4204. Table VII summarizes the ratios of the binder or binder-containing formulation (designated in the table as "binder") to aerogel and aerogel to fibers, various parameters and values measured.

TABLE VII

| ID # | DI water (g) | 50% Pluronic P84 (g) | Binder (g) | TLD302 (g) | Density of dry sample (g/cc) | Compressive Strength (MPa) | Thermal Conductivity (mW/m-K) |
|---|---|---|---|---|---|---|---|
| 12A | 255.0 | 1.0 | 24.9 | 100.2 | 0.123 | 0.025 | 17.2 |
| 12B | 255.0 | 1.0 | 25.0 | 100.2 | 0.127 | | 16.7 |
| 12C | 255.1 | 0.0 | 25.6 | 100.1 | 0.129 | 0.017 | 17.3 |
| 12D | 255.1 | 0.0 | 25.2 | 100.2 | 0.128 | | 17.4 |
| 12E | 255.0 | 0.0 | 25.0 | 100.1 | 0.127 | 0.033 | 16.6 |
| 12F | 255.0 | 0.0 | 25.3 | 100.2 | 0.131 | 0.061 | 17.4 |
| 12G | 255.0 | 1.0 | 25.3 | 100.2 | 0.130 | 0.025 | 18.0 |
| 12H | 255.0 | 1.0 | 24.9 | 100.1 | 0.119 | 0.055 | 17.0 |

EXAMPLE 13

Water was added to a plastic container, followed by the surfactant solution and then by Nanogel® aerogel and binder or binder-containing formulation. The ingredients were mixed with a handheld drill with a helical cement mixer for about 2 minutes resulting in a homogenous mixture that was dry and crumbly. Sample 13A was prepared using 25.0 g of Waterplug Hydraulic Cement, manufactured by Thoro Consumer Products, BASF Construction Chemicals, OH, USA; Sample 13B was prepared using 25.0 g of Thorocrete manufactured by Thoro Consumer Products, BASF Construction Chemicals, OH, USA.

This mixture was poured into rectangular and circular molds and dried overnight (~16 hrs) in a 85° C. oven. The thermal conductivity was measured on a Lasercomp Model Fox 200. The mean temperature of the measurement was 12.5° C. and the bottom and top plates were kept at 25° C. and 0 ° C., respectively. Ratios of various components, parameters measured and values for various measurements are summarized in Table VIII below.

TABLE VIII

| ID # | DI water (g) | 50% Pluronic P84 (g) | Binder (g) | TLD302 (g) | Density of dry sample (g/cc) | Compression Strength (MPa) | Thermal Conductivity (mW/m-K) |
|---|---|---|---|---|---|---|---|
| 13A | 118.0 | 1.0 | 25.0 | 100.1 | 0.135 | | 16.1 |
| 13B | 118.0 | 1.0 | 25.0 | 100.1 | 0.131 | | 16.3 |

EXAMPLE 14

A large scale mixture was prepared by combining 1275 g of water, 5 g of 50%g/g P84 solution, 126 g of Simplefix Premixed Adhesive and Grout, manufactured by Custom Building Products, CA, USA and 501 g of Nanogel™ aerogel TLD302. First water and Simplefix Premixed Adhesive and Grout were mixed for 1 min. Then Nanogel™ was mixed with a handheld drill with a helical cement mixer for about 6 minutes resulting in a homogenous mixture that was pumpable.

This mixture was transferred into rectangular and circular molds, some of which were dried overnight (~16 hrs) in a 85° C. oven. The others were dried at room temperature for ~16 hrs. The thermal conductivity was measured on a Lasercomp Model Fox 200. The mean temperature of the measurement was 12.5° C. and the bottom and top plates were kept at 25° C. and 0° C. respectively. The values for various parameters are provided in Table IX below.

TABLE IX

| Sample | Drying Temperature (° C.) | Density of Dry Composite (g/cc) | Thermal Conductivity (mW/m-K) |
| --- | --- | --- | --- |
| 14A | 25 | 0.095 | 18.3 |
| 14B | 85 | 0.100 | 18.1 |
| 14C | 25 | 0.102 | 17.8 |
| 14D | 85 | 0.105 | 17.7 |

Noticeable shrinkage was seen for the samples dried at room temperature, namely samples 14A and 14C. The shrinkage was measured to be 4 mm on a 200 mm linear dimension.

EXAMPLE 15

The following binders or binder-containing formulations were tested: (a) Simplefix Premixed Adhesive and Grout, manufactured by Custom Building Products, CA, USA; (b) Waterplug Hydraulic Cement, manufactured by Thoro Consumer Products, BASF Construction Chemicals, OH, USA; (c) Elmer's Probond Concrete Bonder, manufactured by Elmer's Products, Inc., OH, USA; and (d) the Fugenweiß grout formulation described above. Sample 12F used a combination of 25% g/g Elmer's Probond Concrete Bonder and 75% g/g. Waterplug Hydraulic Cement. Sample 12H used Simplefix Premixed Adhesive and Grout. Samples 15A and 15B used Fugenweiß grout formulation.

To prepare the samples water was added in a plastic container, followed by surfactant solution and the two were mixed.

For Samples 12C, 15A, 15B no surfactant was added, since the binder-containing formulation used included polymeric additives that are believed to be surface active. Sample 15A was made in two half-size batches using half gallon plastic containers. Sample 15B was made in one taller and thinner container much closer to the diameter of the mixing blade.

For samples 12C, 12F, 15A, once the Nanogel® aerogel and binder or binder-containing formulation were added, the ingredients were mixed with a handheld drill with a helical cement mixer for about 2 min resulting in a homogenous composition which was pumpable and stiffened on standing.

For sample 15B, once Nanogel® aerogel and binder or binder-containing formulation were added, the ingredients were mixed with a handheld cement mixer for about 10 min resulting in a homogenous composition which stiffened rapidly on standing. This sample was stiffer compared to sample 15A, significant shearing of the particles having occurring. The resulting cast had a smoother surface finish compared to 15A. Sample 15B was smoother, plaster-like mixture compared to sample 15A, which was a wet, crumbly paste. Sample 15A had to be poured into the mold, where as sample 15B was spread into the mold. The volume of sample 15B dropped to approximately 55% of the original volume after mixing.

The resulting composition was poured into rectangular and circular molds and dried overnight (~16 hrs) in an oven at 85° C. Density of the samples was determined by measuring the weight and the volume of the molds.

Thermal conductivity measurements in (mW/m-K) were conducted using a Lasercomp Model Fox 200. The mean temperature of the measurement was 12.5° C. and the bottom and top plates were kept at 25° C. and 0° C. respectively. Other mean temperatures as listed in table XA were also measured. For a mean temperature of 23° C., the top and bottom plates were kept at 10° C. and 36° C., respectively. For a mean temperature of 62.5° C., the top and bottom plates were kept at 50° C. and 75° C., respectively. For samples 12F and 12H measurements were taken again after about 26 days from the sample preparation to determine any change in performance. As noted in the tables below, negligible change within error was found.

Compressive strength measurements were performed on a circular cast and were measured on an Instron model 4204. Flexural measurements were performed on samples on an Instron model 4204 using guidelines outlined in ASTM C203. The ratios of the binder to aerogel and aerogel to fibers, various parameters and values measured are summarized in Tables XA and XB:

TABLE XA

| ID # | DI water (g) | 50% Pluronic P84 (g) | Binder (g) | TLD302 (g) | Type of binder | State of mixture |
| --- | --- | --- | --- | --- | --- | --- |
| 12F | 255.0 | 0.0 | 25.3 | 100.2 | 50% hydraulic cement with 50% Elmer's Probond Concrete bonder | pumpable, stiff |
| 12H | 255.0 | 1.0 | 24.9 | 100.1 | Custom Building Products Simplefix Premixed Adh. and Grout | pumpable |
| 15A | 256.2 | 0.0 | 25.3 | 100.4 | Fugenweiß grout formulation | pumpable, stiff |
| 15B | 203.1 | 0.0 | 20.2 | 100.8 | Fugenweiß grout formulöation | |

TABLE XB

| | | | | Lasercomp | | | | |
|---|---|---|---|---|---|---|---|---|
| ID # | Density of dry sample (g/cc) | Instron Compress. Strength (MPa) | Flex. Strength (MPa) | Conduct. at 12.5° C. (mW/m-K) | Conduct. at 23° C. (mW/m-K) | Conduct. at 62.5° C. (mW/m-K) | Conduct. at 12.5° C. (aged) (mW/m-K) | days aged |
| 12F | 0.131 | 0.061 | 0.018 | 17.4 | 23.4 | 24.9 | 17.6 | 26 |
| 12H | 0.114 | 0.055 | 0.016 | 17.0 | 17.7 | 21.0 | 17.0 | 26 |
| 15A | 0.130 | 0.022 | 0.012 | 16.2 | 16.6 | 18.9 | | |
| 15B | 0.147 | — | 0.049 | 16.0 | 16.4 | 18.5 | | |

EXAMPLE 16

A sample with sodium silicate as binder was produced by adding 300 g of pH 13 water, 6 g of 50% P84 solution in water, and 25.1 g of sodium silicate solution (Aldrich Chemicals USA) in a mixing container. An overhead mixer with a double helical attachment was started at 750-800 rpm. 100 g of RB260 Rockwool fibers were added slowly until a homogeneous viscous liquid was formed. 100 g of TLD302 aerogel was added slowly and the mixing speed was lowered by 40-50 rpm with each addition. The homogeneous mixture was placed into the mold and dried overnight at 85 C. The compressive strength of the composite was 0.075 MPa.

EXAMPLE 17

100 g of TLD 302, 25 g of Portland cement (Quickrete USA), 250 g of water were mixed with a helical drill for 2 min. The water was converted to "dry water", a state in which liquid water was encapsulated by the solids, resulting in powder-like material. The mixture remained in a dry powder form until 1g of 50% P84 was added, and upon further mixing for 1 minute, resulted in a wet slurry like sample 12A.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition comprising:
a) an aerogel component;
b) a surfactant;
c) a binder selected from the group consisting of cement, gypsum, lime, acrylate and any combination thereof; and
d) an ingredient selected from the group consisting of glass fibers, stone fibers, slag fibers, biosoluble ceramic fibers, and any combination thereof, wherein the composition has a thermal conductivity no greater than 50 mW/(m-k), measured according to ASTM C518.

2. The composition of claim 1, wherein the fibers are present in the composition, when dried, in an amount within a range greater than 0% and less than 25% by weight of the composition.

3. The composition of claim 1, wherein the fibers are present in the composition, when dried, in an amount of at least 25% by weight of the composition.

4. The composition of claim 1, wherein (c) is either an inorganic binder or an inorganic binder-containing formulation, but not both.

5. The composition of claim 1, wherein the composition is a dry mixture, a slurry or a composite.

6. The composition of claim 5, wherein the slurry is pumpable, sprayable or paintable.

7. The composition of claim 5, wherein the composition is a composite having a thermal conductivity that is no greater than about 35 MW/(m-K), measured according to ASTM C518.

8. The composition of claim 5, wherein the composition is a composite having a thermal conductivity that is no greater than about 20 mW/(m-K), measured according to ASTM C518.

9. The composition of claim 5, wherein the composite is a self-supporting rigid composite.

10. The composition of claim 5, wherein the composite is a coating.

11. The composition of claim 1, wherein the aerogel is a hydrophobic particulate silica aerogel.

12. The composition of claim 1, wherein the binder-containing formulation is a grout formulation in accordance with European Standard EN 13888.

13. A self-supporting rigid composite comprising an aerogel component in particulate form, a binder selected from the group consisting of cement, gypsum, lime, acrylate and any combination thereof, and at least one other ingredient and having a thermal conductivity no greater than about 20 mW/(m-K), measured according to ASTM C518, wherein the at least one other ingredient includes fibers selected from the group consisting of glass fibers, stone fibers, slag fibers, biosoluble ceramic fibers, and any combination thereof.

14. The self-supporting rigid composite of claim 13, wherein the self-supporting rigid composite includes a binder.

15. The self-supporting rigid composite of claim 14, wherein the binder is selected from the group consisting of cement, gypsum, lime, acrylate and any combination thereof.

16. The self-supporting rigid composite of claim 15, wherein the fibers are present in the composite in an amount within a range greater than 0% and less than 25% by weight of the composition.

17. The self-supporting rigid composite of claim 15, wherein the fibers are present in the composite in an amount of at least 25% by weight of the composition.

18. The self-supporting rigid composite of claim 13, wherein the composite has flame retarding properties.

19. The self-supporting rigid composite of claim 13, wherein said composite has a compressive strength within the range of from about 0.05MPa to about 0.3MPa.

20. The self-supporting rigid composite of claim 13, wherein said composite has a flexural strength of up to about 0.04MPa.

21. A composition comprising:
a) an aerogel component;
b) an acrylate in an amount of less than 11%;
c) a binder or a binder-containing formulation; and d) at least one other ingredient comprising inorganic fibers, that are mineral wool fibers or a woven, non-woven or chopped form of continuously made glass or stone fiber, wherein the composition has a thermal conductivity no greater than 20 mW/(m-K), measured according to ASTM 0518.

* * * * *